United States Patent [19]
Arata

[11] Patent Number: 4,741,224
[45] Date of Patent: May 3, 1988

[54] FLYWHEEL

[75] Inventor: Tadao Arata, Inagi, Japan

[73] Assignee: Tanashin Denki Co., Ltd., Tokyo, Japan

[21] Appl. No.: 932,362

[22] Filed: Nov. 19, 1986

[30] Foreign Application Priority Data

Aug. 8, 1986 [JP] Japan ................. 61-121674

[51] Int. Cl.⁴ .................. G05G 1/00; G05G 3/00; B60B 27/00; B25G 3/28
[52] U.S. Cl. .................. 74/572; 403/1; 403/359
[58] Field of Search ............ 74/572, 571 M, 519, 74/526, 503; 310/90; 403/359, 1; 384/246, 248

[56] References Cited

U.S. PATENT DOCUMENTS

| | | | |
|---|---|---|---|
| 3,121,346 | 2/1964 | Sutton | 74/503 |
| 3,287,031 | 11/1966 | Simmons et al. | 403/359 |
| 3,722,929 | 3/1973 | Gilman | 403/359 |
| 3,742,656 | 7/1973 | Amos | 403/359 |
| 3,898,814 | 8/1975 | Chou et al. | 74/572 |
| 3,912,406 | 10/1975 | McGrath | 403/369 |
| 3,965,528 | 6/1976 | Kissler | 403/359 |
| 4,566,350 | 1/1986 | Miyamoto et al. | 74/519 |
| 4,579,018 | 4/1986 | Ohashi | 403/359 |
| 4,639,163 | 1/1987 | Buthe et al. | 403/359 |
| 4,657,428 | 4/1987 | Wiley | 403/359 |

FOREIGN PATENT DOCUMENTS

| | | | |
|---|---|---|---|
| 622731 | 6/1961 | Canada | 74/503 |
| 0010799 | 1/1982 | Japan | 74/572 |
| 00112752 | 8/1983 | Japan | 74/572 |

OTHER PUBLICATIONS

Speed Nut Flash No. 159, Sep. 7, 1953, Tinnerman Products, Inc., Cleveland, Ohio.

*Primary Examiner*—Gary L. Smith
*Assistant Examiner*—Vinh Luong
*Attorney, Agent, or Firm*—Wegner & Bretschneider

[57] ABSTRACT

A flywheel suitable for use in a tape recorder or the like is composed of an annular metal plate and a plastic pulley superposed coaxially as a unitary member with the plate. The plate defines a plurality of outwardly-extending notches at an equal angular interval along an inner peripheral edge thereof and the corresponding number of interlocking holes between the respective notches. The pulley is provided with a plurality of holding lugs extending outwardly beyond the inner peripheral edge of the plate and holding an inner peripheral edge portion between the lugs and a main part of the pulley. The main part of the pulley is provided, at at least one of locations opposing to the interlocking lugs, with an elastic interlocking member maintained in engagement with one of the interlocking holes.

3 Claims, 4 Drawing Sheets dfd
FLYWHEEL

BACKGROUND OF THE INVENTION (1) Field of the Invention

This invention relates to a flywheel suitable for use in a tape recorder or the like.

(2) Description of the Prior Art

Flywheels employed in tape recorders and the like are generally of such a type that a shaft extends centrally through a metallic rotary body formed as an integral member by a die or the like and is fixed to the body. They however require many production steps especially where pulleys are formed in the metal disks, resulting in higher production costs.

With the foregoing in view, it has recently been contemplated to produce flywheels of the above sort by combining annular metal plates and pulleys made of a synthetic resin (see, for example, Japanese Utility Model Laid-Open No. 112752/1983 or U.S. patent application Ser. No. 06/726,297 filed on Jan. 27, 1983 now abandoned. One example of such recent flywheels will next be described in brief with reference to FIGS. 7 and 8, which are cross-sectional side view and top plan view of the exemplary flywheel respectively.

In FIGS. 7 and 8, numeral 71 indicates an annular metal plate while numeral 72 designates a pulley made of a synthetic resin (may hereinafter be called "plastic pulley" for the sake of brevity). They are coaxially superposed and fixed to each other. A shaft, for example, a capstan 73 is centrally and fixedly inserted through the pulley 72. As exemplary means for fixing the annular metal plate 71 and plastic pulley 72 to each other, the plastic pulley 72 is provided with four hooks 74 which are maintained in engagement with an inner peripheral edge portion of the annular metal plate 71. Since the unification of the annular metal plate 71 and pulley 72 cannot be achieved fully by the interlocking hooks 74 alone, a double-tack sheet 75 is also interposed therebetween to adhere them firmly with each other.

Flywheels of the above-described sort are however accompanied inter alia by the following problems. It is necessary to apply the double-tack sheet 75 to either one of the annular metal plate 71 and plastic pulley 72 before superposing them with each other. This step is very cumbersome. If the double-tack sheet 75 should be omitted, problems will arise if the hooks 74 undergo plastic deformation during a high-temperature test which is conducted as the final step of the production process of the flywheel. Namely, the hooks 74 will lose their holding function for the annular metal plate 71, leading to such problems that the annular metal plate 71 and plastic pulley 72 may be separated from each other and/or may be caused to idle relative to each other.

SUMMARY OF THE INVENTION

With the foregoing in view, the present invention has as its principal object the provision of a flywheel which can facilitate the assembly work of an annular metal plate and its associated plastic pulley and permits a reduction to its production cost.

In one aspect of this invention, there is thus provided a flywheel composed of an annular metal plate and a pulley made of a synthetic resin and superposed coaxially as a unitary member with the annular metal plate. The annular metal plate defines a plurality of outwardly-extending notches at an equal angular interval along the inner peripheral edge and the corresponding number of interlocking holes along the inner peripheral edge between the respective notches. The pulley is provided at the same equal angular interval as the angular interval of the notches with a plurality of holding lugs extending outwardly beyond the inner peripheral edge of the annular metal plate and holding an inner peripheral edge portion between the lugs and a main part of the pulley. The main part of the pulley is provided, at at least one of the locations opposing the interlocking lugs, with an elastic interlocking member maintained in engagement with said one of holes, so that upon assembly of the flywheel, the elastic interlocking member is brought into engagement with said one of the interlocking holes by coaxially superposing the metal plate and pulley with the holding lugs and elastic interlocking member registered with the notches and then turning the metal plate and pulley relative to each other.

Owing to the function of the holding lugs provided with the plastic pulley, the annular metal plate and plastic pulley are prevented from separation. In addition, the elastic holding member serves as a stopper for relative rotation so that the annular metal plate and plastic pulley are prevented from idling. Since the annular metal plate and plastic pulley are combined together by turning the holding lugs away from the notches and holding the inner peripheral edge portion of the annular metal plate between the holding lugs and the main part of the plastic pulley, it is possible to allow the holding lugs to overlap with the annular metal plate at sufficiently wide areas. Owing to this feature, the annular metal plate and plastic pulley do not separate from each other even if the plastic pulley should undergo plastic deformation to a certain extent. Since the interlocking member is made of the synthetic resin, i.e., an elastic material, each elastic deformation of the interlocking member can be absorbed by itself so long as the elastic deformation is not excessive. The above-mentioned idling can hence be prevented without failure.

BRIEF DESCRIPTION OF THE DRAWINGS

The above and other objects, features and advantages of the present invention will become apparent from the following description of the invention and the appended claims, taken in conjunction with the accompanying drawings, in which:

DETAILED DESCRIPTION OF THE INVENTION AND PREFERRED EMBODIMENT

Figure 1:
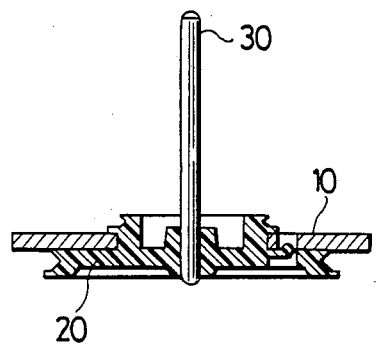
FIG. 1 is a simplified cross-sectional view of a flywheel according to one embodiment of this invention.

Referring first to FIG. 1, the flywheel has been constructed by coaxially interposing an annular metal plate 10 punched out from a sheet metal such as iron plate or stainless steel plate and a plastic pulley 20, inserting a shaft (for example, capstan) 30 centrally through the pulley 20 and then fixing the shaft 30 to the pulley 20.

Figure 2:
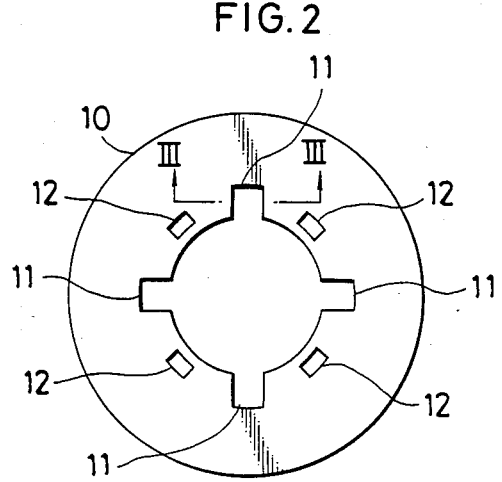
FIG. 2 is a top plan view showing the structure of an annular metal plate employed in the embodiment.
Figure 3:
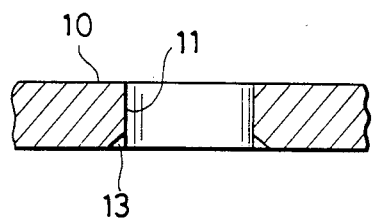
FIG. 3 is an enlarged fragmentary cross-sectional view as seen in the direction indicated by the arrows III,III in FIG. 2.

As illustrated in FIG. 2, four outwardly-extending notches 11 are formed at an equal interval of 90 degrees along the inner peripheral edge portion 14 of the annular metal plate 10 and four interlocking holes 12 are also formed through the the annular metal plate 10 at locations shifted over 45 degrees from the their corresponding notches 11. On the lower side of the annular metal plate 10, both side edges of each of the notches 11 are machined into chamfers 13 as depicted on an enlarged scale in FIG. 3 which is a cross-sectional view as seen in the direction indicated by the arrow III,III in FIG. 2. The provision of the chamfers 13 facilitates release of the elastic interlocking member during the assembly work of the flywheel as will be described herein.

Figure 4:
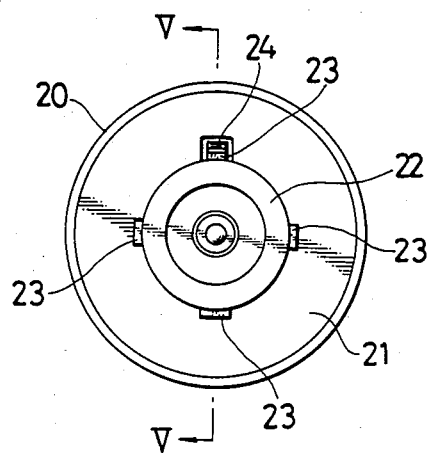
FIG. 4 is a top plan view showing the structure of a plastic pulley employed in the embodiment.
Figure 5:
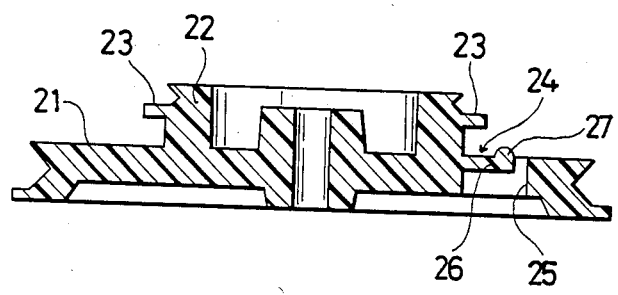
FIG. 5 is an enlarged cross-sectional view as seen in the direction indicated by the arrows V,V in FIG. 4.

On the other hand, the plastic pulley 20 is composed of a disk 21, a ring 22, holding lugs 23 and an elastic interlocking member 24 as illustrated in FIG. 4, which is a top plan view, and in FIG. 5 which is an enlarged cross-sectional view as seen in the direction indicated by the arrows V,V in FIG. 4. The plastic pulley 20 is formed as an integral body by molding it with a resin. The disk 21 defines centrally a through-hole through which the capstan 30 extends. A belt or the like is mounted on the peripheral outer wall of the disk 21. The ring 22 has an outer diameter slightly smaller than the diameter of the central hole of the annular metal plate 10 and extends upwardly from the upper surface of the disk 21. In a state inserted through the circular hole of the annular metal plate 10, an upper part of the ring 22 projects out beyond the upper surface of the annular metal plate 10.

The holding lugs 23 are formed in the vicinity of the upper extremity of the ring 22 and extend outwardly from the outer wall of the ring 22. In the illustrated embodiment, four holding lugs 22 are formed at an angular interval of 90 degrees. The inner peripheral edge portion 14 of the annular metal plate 10 is held between the holding lugs 23 and the upper surface of the disk 21. A through-hole 25 is formed through the disk 21 at a location opposing to one of the holding lugs 23. An elastic interlocking member 24 is formed of a thin planar part 26, which extends outwardly in the through-hole 25 with the inner end thereof connected to the disk 21 but the outer end thereof maintained free, and a projection 27 formed at the outer end of the thin planar part 26 and extending out upwardly beyond the upper surface of the disk 21 toward the annular metal plate. The elastic interlocking member 24 is maintained in engagement with the interlocking hole 12 of the annular metal plate 10.

Figure 6A:
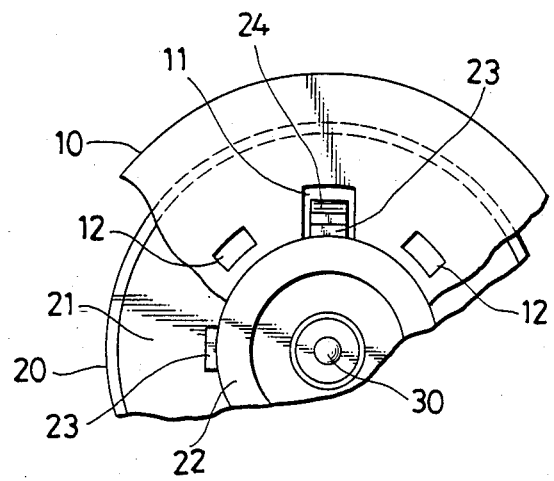
FIGS. 6(a) and 6(b) illustrate the assembly work of the flywheel in different stages.

Upon assembly of the above-described flywheel, the holding lugs 23 and elastic interlocking member 24 formed on the plastic pulley 20 are first of all brought into registration with the notches 11 and are then axially fit in the notches 11, as depicted in FIG. 6(a). At this stage, the projection 27 of the elastic interlocking member 24 extends in the corresponding notch 11 and the holding lugs 23 are located above the upper surface of the annular metal plate 10.

Figure 6B:
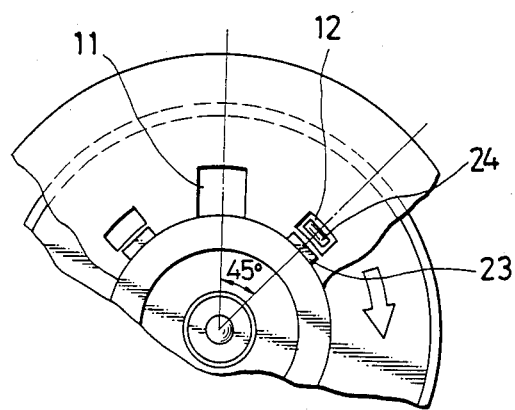
Figure 7:
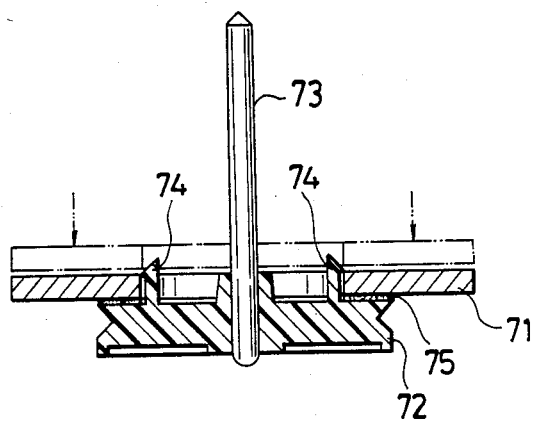
FIG. 7 is a cross-sectional view of a conventional flywheel shown in FIG. 8, which is seen in the direction indicated by VII,VII in FIG. 8 and illustrates the structure of a conventional flywheel.
Figure 8:
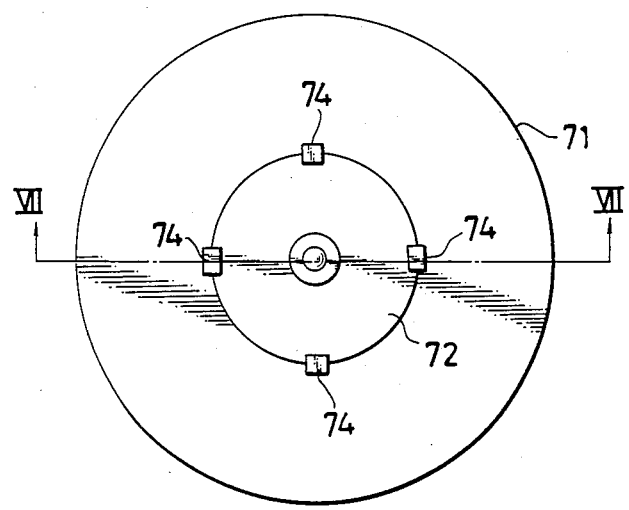
FIG. 8 is a top plan view of the conventional flywheel.

Thereafter, as shown in FIG. 6(b), the annular metal plate 10 and plastic pulley 20 are turned over a predetermined angle (45° in the illustrated embodiment) relative to each other so that the elastic interlocking member 24 is brought into engagement with one of the interlocking holes 12. At this stage, the holding lugs 23 are located on the upper surface of the annular metal plate 10, whereby the annular metal plate 10 is held between the upper surface of the disk 21 and the holding lugs 23. On the other hand, the elastic interlocking member 24 which has been in engagement with the corresponding notch 11 is released readily from the notch 11 owing to the chamfer 13 provided in the lower surface of the annular metal plate 10. At a position corresponding to the interlocking hole 12, the projection 27 of the elastic interlocking member 24 is brought into engagement with the interlocking hole 12. Owing to the elasticity of the elastic interlocking member 24, the projection 27 is biased toward the interlocking hole 12.

As a result, the annular metal plate 10 is held at both sides thereof between the upper surface of the disk 21 forming the plastic pulley 20 and the four holding lugs 22 and moreover, is prevented from turning relative to the plastic pulley 20 by the elastic interlocking member 24 maintained in engagement with the interlocking hole 12.

According to the present embodiment, the annular metal plate 10 and plastic pulley 10 can be united together by superposing them and then turning them to each other until the elastic interlocking member 24 engages the interlocking hole 12. Unlike the prior art, the present invention does not require the application of any double-tack sheet or the like so that the assembly can be completed with extreme easy. It is therefore possible to facilitate the assembly work and hence to reduce the production cost.

In addition, the holding lugs 23 are shifted from the corresponding notches 11 along the inner peripheral edge portion 14 of the annular metal plate 10 and are hence brought into contact with the upper surface of the annular metal plate 10. It is hence possible to make the holding lugs 23 substantially long in the radial direction of the annular metal plate 10. It is thus possible to avoid such inconvenience that the annular metal plate 10 and plastic pulley 20 could be separated from each other, even if the plastic pulley 20 undergoes some plastic deformation.

It should however be borne in mind that the present invention is not limited to or by the following embodiment. For example, the numbers of the notches and holding lugs are not necessarily limited to 4. Their numbers may be suitably changed depending on their specifications. Similarly, the present invention is not limited to the use of only one elastic interlocking member. The number of elastic interlocking members may be determined suitably within a range not exceeding the number of the interlocking holes.

Having now fully described the invention, it will be apparent to one of ordinary skill in the art that many changes and modifications can be made thereto without departing from the spirit or scope of the invention as set forth herein.

I claim:

1. In a flywheel composed of an annular metal plate and a pulley made of a synthetic resin and superposed coaxially as a unitary member with the annular metal plate, the improvement wherein the annular metal plate defines a plurality of outwardly-extending notches at an equal angular interval along an inner peripheral edge portion and a corresponding number of interlocking holes along the inner peripheral edge portion between the respective notches; the pulley is provided at the same equal angular interval as the angular interval of the notches with a plurality of holding lugs extending outwardly beyond the inner peripheral edge of the annular metal plate and holding the inner peripheral edge portion between the lugs and the pulley; and the pulley is provided, at at least one of locations opposing to the interlocking lugs, with an elastic interlocking member maintained in engagement with one of the holes, so that upon assembly of the flywheel, the elastic interlocking member is brought into engagement with said one of the interlocking holes by coaxially superposing the metal plate and pulley with the holding lugs and elastic interlocking member registered with the notches and then turning the metal plate and pulley relative to each other.

2. The flywheel as claimed in claim 1, wherein the elastic interlocking member comprises a thin planar part, which extends in an outward direction and is formed in the pulley with the inner end thereof connected to the pulley but the outer end thereof maintained free, and a projection formed at the outer end of the thin planar part and extending toward the annular metal plate.

3. The flywheel as claimed in claim 1, wherein the notches of the annular metal plate are formed at an angular interval of 90 degrees and the interlocking holes of the annular metal plate are formed at an angular interval of 90 degrees at locations shifted over 45 degrees from their corresponding notches.

* * * * *